(12) United States Patent
Kim et al.

(10) Patent No.: US 11,216,399 B2
(45) Date of Patent: *Jan. 4, 2022

(54) APPLICATION PROCESSOR FOR LOW POWER OPERATION, ELECTRONIC DEVICE INCLUDING THE SAME AND METHOD OF OPERATING THE SAME

(71) Applicant: SAMSUNG ELECTRONICS CO., LTD., Suwon-si (KR)

(72) Inventors: Sun-Kyu Kim, Yongin-si (KR); Byung-Tak Lee, Jeju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,532

(22) Filed: Aug. 20, 2020

(65) Prior Publication Data

US 2020/0379932 A1  Dec. 3, 2020

Related U.S. Application Data

(63) Continuation of application No. 16/183,994, filed on Nov. 8, 2018, now Pat. No. 10,754,804.

(30) Foreign Application Priority Data

Jan. 25, 2018 (KR) ................ 10-2018-0009330

(51) Int. Cl.
*G06F 13/36* (2006.01)
*G10L 15/08* (2006.01)
(Continued)

(52) U.S. Cl.
CPC ........... *G06F 13/36* (2013.01); *G10L 15/08* (2013.01); *G10L 15/22* (2013.01); *G10L 2015/088* (2013.01)

(58) Field of Classification Search
CPC ........... G08B 21/24; G08B 3/10; G06F 17/28
See application file for complete search history.

(56) References Cited

U.S. PATENT DOCUMENTS 5,524,261 A   6/1996  Daly et al.
8,843,173 B2  9/2014  Lee et al.
(Continued)

FOREIGN PATENT DOCUMENTS

CN   101609676 A   12/2009
CN   105723451 A    6/2016
(Continued)

OTHER PUBLICATIONS

Communication dated Mar. 1, 2021 by the State Intellectual Property Office of P.R. China in counterpart Chinese Application No. 201910032095.8.

(Continued)

*Primary Examiner* — Getente A Yimer
(74) *Attorney, Agent, or Firm* — Sughrue Mion, PLLC

(57) ABSTRACT

An application processor includes a system bus, a host processor, a voice trigger system and an audio subsystem that are electrically connected to the system bus. The voice trigger system performs a voice trigger operation and issues a trigger event based on a trigger input signal that is provided through a trigger interface. The audio subsystem includes an audio interface and processes audio streams through the audio interface. The voice trigger system is disposed in an always-powered domain where power is supplied in both of an active mode and a standby mode. The host processor and the audio subsystem are disposed in a power-save domain where power is blocked in the standby mode. The host processor launches into the active mode when the voice trigger system issues the trigger event.

20 Claims, 15 Drawing Sheets

(51) Int. Cl.
    *G10L 15/22*               (2006.01)
    *H04M 1/72433*        (2021.01)
    *H04M 1/72484*        (2021.01)
    *H04M 1/724*           (2021.01)

(56) References Cited

U.S. PATENT DOCUMENTS

| | | |
|---|---|---|
| 9,478,231 B1 | 10/2016 | Soman |
| 9,582,983 B2 | 2/2017 | Dadu et al. |
| 9,811,313 B2 | 11/2017 | Johnson et al. |
| 10,133,332 B2 | 11/2018 | Wong et al. |
| 2002/0099893 A1 | 7/2002 | Nguyen et al. |
| 2006/0047754 A1 | 3/2006 | Wenkata Subramanian et al. |
| 2009/0307511 A1* | 12/2009 | Fiennes ................ G06F 1/3215 |
| | | 713/323 |
| 2009/0319260 A1 | 12/2009 | Kong et al. |
| 2012/0250877 A1 | 10/2012 | Cheng et al. |
| 2014/0195708 A1 | 7/2014 | Klein et al. |
| 2015/0032238 A1 | 1/2015 | Ondo et al. |
| 2015/0070184 A1* | 3/2015 | Dadu ................ H04M 1/72403 |
| | | 340/692 |
| 2015/0221307 A1* | 8/2015 | Shah .................... G06F 1/3293 |
| | | 704/253 |
| 2017/0031420 A1 | 2/2017 | Wong et al. |
| 2017/0060596 A1 | 3/2017 | Su |
| 2018/0181364 A1* | 6/2018 | Gupta .................... G06F 3/162 |

FOREIGN PATENT DOCUMENTS

| | | |
|---|---|---|
| CN | 106062661 A | 10/2016 |
| TW | I266202 B | 11/2006 |
| WO | 2015/038105 A1 | 3/2015 |

OTHER PUBLICATIONS

Communication dated Jul. 27, 2021 issued by the State Intellectual Property Office of P.R. China in counterpart Chinese Application No. 201910032095.8.

* cited by examiner

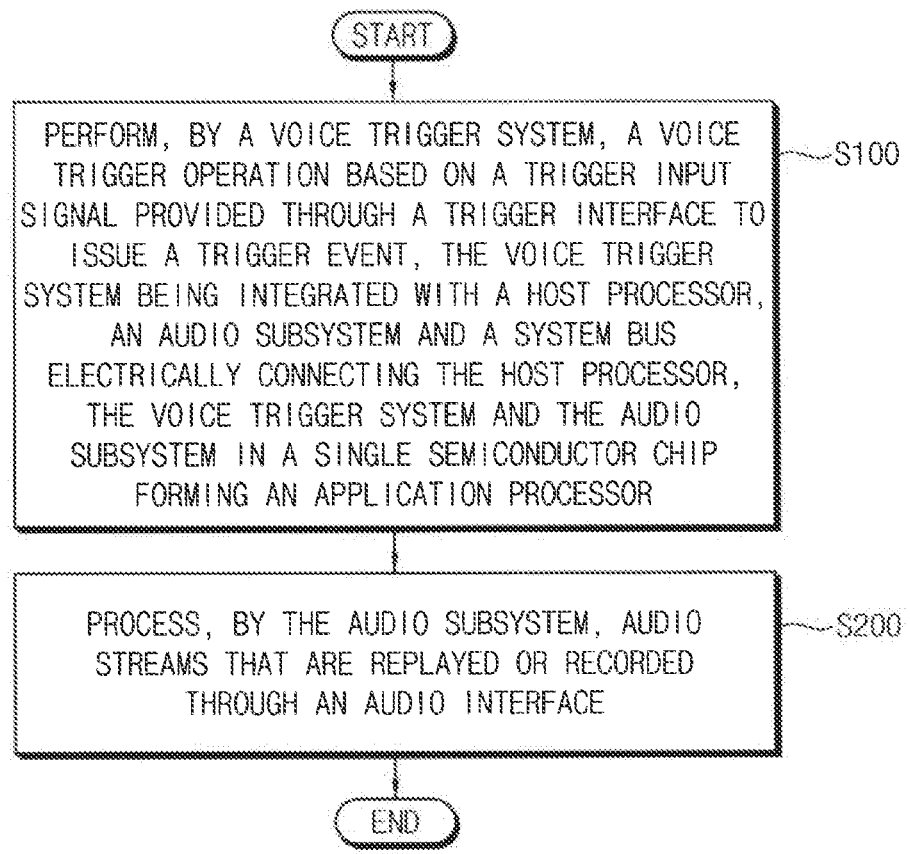

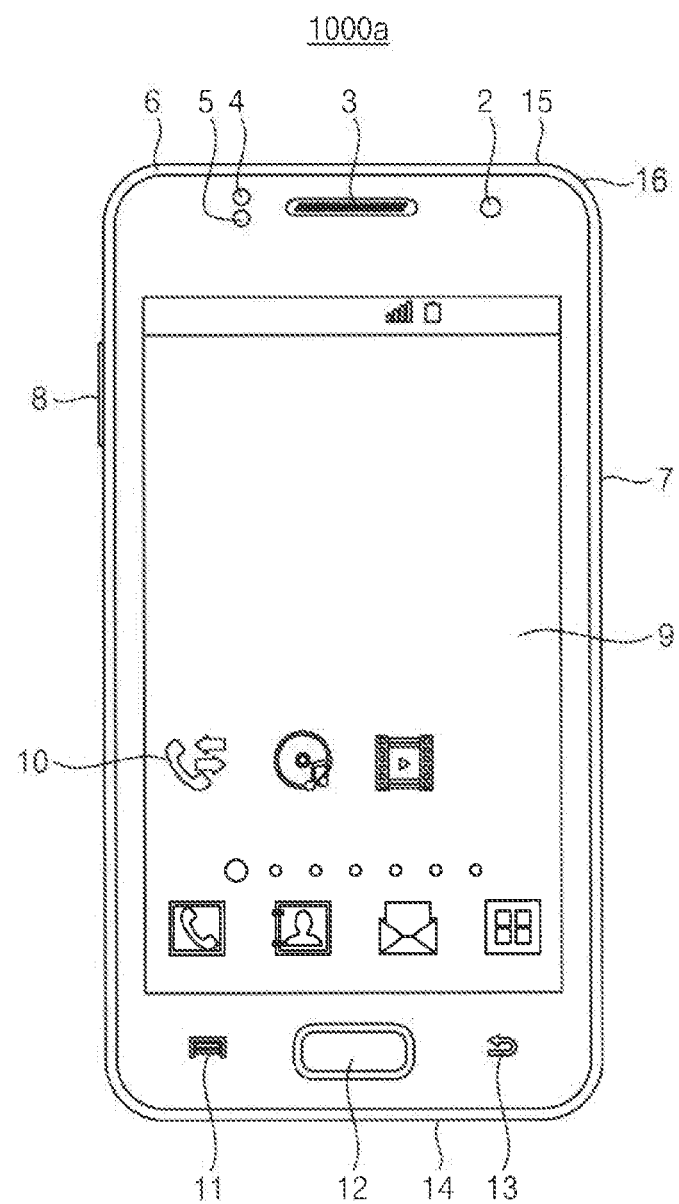

APPLICATION PROCESSOR FOR LOW POWER OPERATION, ELECTRONIC DEVICE INCLUDING THE SAME AND METHOD OF OPERATING THE SAME

CROSS-REFERENCE TO RELATED APPLICATION

This Application is a continuation of U.S. application Ser. No. 16/183,994, filed on Nov. 8, 2018 in the U.S. Patent and Trademark Office, and claims priority under 35 USC § 119 to Korean Patent Application No. 10-2018-0009330, filed on Jan. 25, 2018, in the Korean Intellectual Property Office (KIPO), the entire contents of each of which are incorporated by reference herein in their entireties.

BACKGROUND

1. Technical Field

Apparatuses, methods, devices, and articles of manufacture consistent with the present disclosure relate generally to semiconductor integrated circuits, and more particularly to an application processor for low power operation, an electronic device including the application processor and an associated method.

2. Discussion of the Related Art

Recently, voice-based or sound-based intelligent interfaces have been introduced. One advantage of such voice-based intelligent interfaces is that users can interact with a device in a hands-free manner without handling or even looking at the device. Hands-free operation can be particularly beneficial when a person cannot or should not physically handle a device, such as when they are driving or when they have a physical disability, etc. However, to initiate the voice-based intelligent interface, users typically must press a button or select an icon on a touch screen. This tactile input detracts from the user experience of the voice-based intelligent interface.

Accordingly, the electronic devices have been developed to activate a voice-based intelligent interface using inputs of voice, speech, sound, sensing, etc., rather than a tactile input. The electronic device performs continuous or intermittent monitoring of an audio channel to detect the voice input and issue a trigger event for initiating the voice-based intelligent interface. The operation for issuing the trigger event may be referred to as a voice trigger operation. This monitoring of the audio channel consumes electrical power, which is a limited resource on handheld or portable devices that rely on batteries. Thus, it is advantageous to provide an energy-efficient solution associated with the voice trigger operation.

SUMMARY

It is an aspect to provide an application processor and an electronic device including an application processor capable of performing a voice trigger operation with low power.

It is another aspect to provide a method of operating an application processor capable of performing a voice trigger operation with low power.

According to an aspect of one or more example embodiments, an application processor includes a system bus; a host processor electrically connected to the system bus; a voice trigger system electrically connected to the system bus, the voice trigger system being configured to perform a voice trigger operation and issue a trigger event based on a trigger input signal that is provided through a trigger interface; and an audio subsystem comprising an audio interface and electrically connected to the system bus, the audio subsystem being configured to process audio streams through the audio interface.

According to another aspect of one or more example embodiments, an electronic device includes at least one audio input-output device; and an application processor comprising a system bus; a host processor electrically connected to the system bus; a voice trigger system electrically connected to the system bus, the voice trigger system being configured to perform a voice trigger operation and issue a trigger event based on a trigger input signal that is provided through a trigger interface; and an audio subsystem comprising an audio interface and electrically connected to the system bus, the audio subsystem being configured to process audio streams through the audio interface.

According to another aspect of one or more example embodiments, a method includes performing, by a voice trigger system, a voice trigger operation based on a trigger input signal provided through a trigger interface to issue a trigger event, the voice trigger system being integrated, in a single semiconductor chip forming an application processor, with a host processor, an audio subsystem and a system bus electrically connecting the host processor, the voice trigger system and the audio subsystem; and processing, by the audio subsystem, audio streams through an audio interface of the audio subsystem.

BRIEF DESCRIPTION OF THE DRAWINGS

Example embodiments will be more clearly understood from the following detailed description taken in conjunction with the accompanying drawings, in which:

FIG. 1 is a flow chart illustrating a method of operating an application processor according to example embodiments;

FIG. 2B is an example implementation of the electronic device of FIG. 2A;

DETAILED DESCRIPTION

Figure 2A:
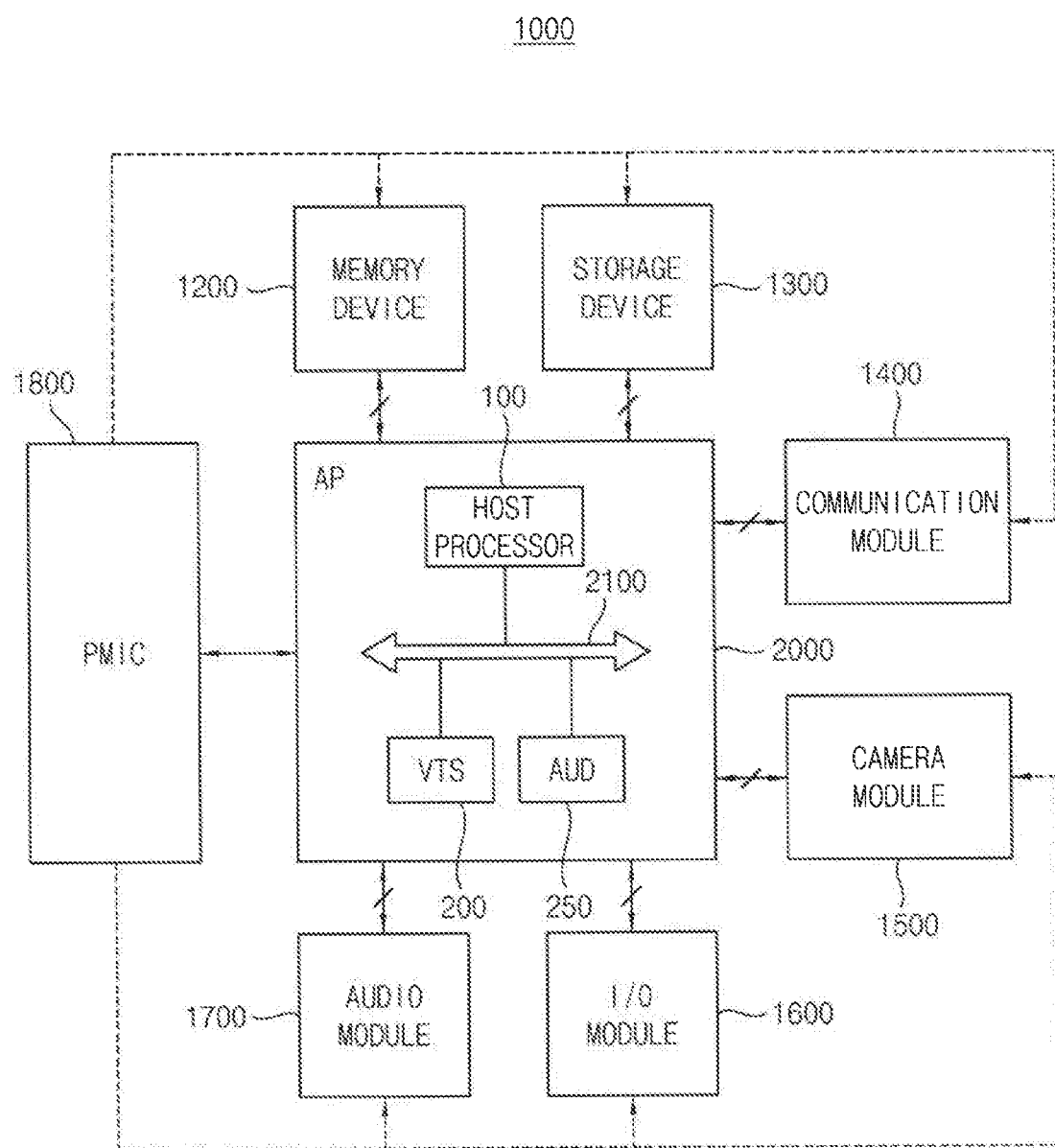
FIG. 2A is a block diagram illustrating an electronic device according to example embodiments.

Various example embodiments will be described more fully hereinafter with reference to the accompanying drawings, in which some example embodiments are shown. In the drawings, like numerals refer to like elements throughout. The repeated descriptions may be omitted.

The application processor, the electronic device including the application processor and the method of operating the application processor according to example embodiments may perform the voice trigger operation with low power and high efficiency by integrating the voice trigger system in the application processor. The on-chip voice trigger system may perform some operations instead of a host processor in the application processor to reduce the power consumption and enhance the performance of the electronic device. In addition, data communication independent of a system bus may be performed using the on-chip voice trigger system and a direct bus to reduce a wakeup frequency of the application processor to further reduce the power consumption and enhance the performance.

FIG. 1 is a flow chart illustrating a method of operating an application processor according to example embodiments.

Referring to FIG. 1, in an application processor in which a host processor, a voice trigger system, an audio subsystem and a system bus electrically connecting the host processor, the voice trigger system and the audio subsystem are integrated as a single semiconductor chip, a voice trigger operation is performed by the voice trigger system based on a trigger input signal provided through a trigger interface to issue a trigger event (S100). Audio streams that are replayed or recorded through an audio interface are processed by the audio subsystem (S200). The audio subsystem may further support the transfer of the audio streams between the audio interface and a memory device.

The voice trigger operation in this disclosure may indicate an operation to monitor whether a trigger input signal includes a particular trigger sound and issue a trigger event such as an interrupt signal to initiate a voice recognition mode or a voice-based intelligent interface when the trigger sound is detected. The initiation of the voice recognition mode may include launching the host processor and/or the system bus into an active mode.

In some example embodiments, the trigger sound may include a word and/or a phrase of a human voice. In other example embodiments, the trigger sound may include sounds other than the human voice such as a whistle, a sound of hand clapping, a siren, a sound of collision, a sound wave of a particular frequency range, etc.

The application processor, the electronic device including the application processor and the method of operating the application processor according to example embodiments may perform the voice trigger operation with low power and high efficiency by integrating the voice trigger system in the application processor.

FIG. 2A is a block diagram illustrating an electronic device according to example embodiments.

Referring to FIG. 2A, an electronic device 1000 includes an application processor AP 2000, a memory device 1200, a storage device 1300, a plurality of functional modules, including a communication module 1400, a camera module 1500, an input/output (I/O) module 1600 and an audio module 1700, and a power management integrated circuit PMIC 1800.

The application processor 2000 controls overall operations of the electronic device 1000. For example, the application processor 2000 may control the memory device 1200, the storage device 1300 and the plurality of functional modules 1400, 1500, 1600 and 1700. The application processor 2000 may be a system on chip (SoC).

The application processor 2000 may include a system bus 2100, a host processor 100 (also called a central processing unit (CPU)), a voice trigger system VTS 200 and an audio processing system AUD 250, which are electrically connected to the system bus 2100.

The voice trigger system 200 may be electrically connected to the system bus 2100 perform a voice trigger operation and issue a trigger event based on a trigger input signal that is provided through a trigger interface. The audio processing system 240 may include an audio subsystem and may further include a sensor hub as will be described below. The audio subsystem may be electrically connected to the system bus 2100 to process audio streams that are replayed or recorded through an audio interface. In addition, the audio subsystem may further support the transfer of the audio streams between the audio interface and the memory device 1200. Example embodiments of the voice trigger system 200 and the audio processing system 250 will be described below with reference to FIGS. 3 through 12B.

The memory device 1200 and the storage device 1300 may store data for operations of the electronic device 1000. The memory device 1200 may include a volatile memory device, such as a dynamic random access memory (DRAM), a static random access memory (SRAM), a mobile DRAM, etc. The storage device 1300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In some example embodiments, the storage device 1300 may further include an embedded multimedia card (eMMC), a universal flash storage (UFS), a solid state drive (SSD), a hard disk drive (HDD), a CD-ROM, etc.

The functional modules 1400, 1500, 1600 and 1700 may perform various functions of the electronic device 1000. For example, the electronic device 1000 may include the communication module 1400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.), the camera module 1500 that performs a camera function, the input-output (I/O) module 1600 including a display module that performs a display function and a touch panel module that performs a touch sensing function, and the audio module 1700 including a microphone (MIC) module, a speaker module, etc. that performs input-output of audio signals. In some example embodiments, the electronic device 1000 may further include a global positioning system (GPS) module, a gyroscope module, etc. However, the functional modules 1400, 1500, 1600 and 1700 in the electronic device 1000 are not limited thereto.

The power management integrated circuit 1800 may provide an operating voltage to the application processor 2000, the memory device 1200, the storage device 1300 and the functional modules 1400, 1500, 1600 and 1700.

FIG. 2B is an example implementation of the electronic device of FIG. 2A.

The electronic device 1000 of FIG. 2A may be a device, such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, etc. The electronic device 1000 may typically be operated in response to direct user input, but may also be used to communicate with other devices via the Internet or other network systems. FIG. 2B illustrates a cellular phone or a smart phone including a touch screen as an example of the electronic device 1000 of FIG. 2A.

Referring to FIG. 2B, an electronic device 1000a includes a front camera 2, a speaker 3, a proximity sensor 4, a luminance sensor 5, a universal serial bus (USB) interface 6, a power button 7, a volume button 8, a display and touch screen 9, icons 10, a menu button 11, a home button 12, a back button 13, a microphone 14, an audio output interface 15, and an antenna 16.

The front camera 2 may face in a direction in which the display and touch screen 9 and is used for a video call or video or photo shooting. The speaker 3 may output audio data when a user plays multimedia data by touching the display and touch screen 9 on one of the icons 10 or inputting a signal by speech, talks with another user over a public switched telephone network, or plays an operation sound of the electronic device 1000a or a notification sound. The proximity sensor 4 may control on or off of the display and touch screen 9 in order to save power and prevent miss-operation when a user holds the electronic device 1000a up to an ear for telephone conversation. The luminance sensor 5 may control the operations of the display and touch screen 9 and the front camera 2 according to the quantity of incident light from the surroundings of the electronic device 1000a. The USB interface 6 may be an input/output interface for data communication with external devices and power supply.

The power button 7 may turn on or off the power of the electronic device 1000a or may turn on or off the display and touch screen 9. The volume button 8 may control the audio output of the speaker 3. The icons 10 corresponding to different functions may be displayed on the display and touch screen 9. For example, a user may touch an icon 10 corresponding to playback of multimedia data.

The menu button 11 may allow a user to browse a menu including icons and settings. The home button 12 may allow a home screen to appear for multi-working mode even while the electronic device 1 is performing a certain operation on the display and touch screen 9. The back button 13 may cancel an operation which is currently being performed by the electronic device 1000a and returns a user to a previous screen.

The microphone 14 may be an input/output (I/O) interface for voice calls or voice input signals. The audio output interface 15, e.g., an earphone jack, may be for audio output of multimedia data which is being played. Although not shown, audio output and microphone input may be interfaced through a device supporting Bluetooth. The antenna 16 may be used to receive digital media broadcasting service. The elements of the electronic device 1000a may be embodied in various ways realizable to those of ordinary skill in the art. Some of the elements in FIG. 2B may be omitted or replaced with other elements.

Figure 3:
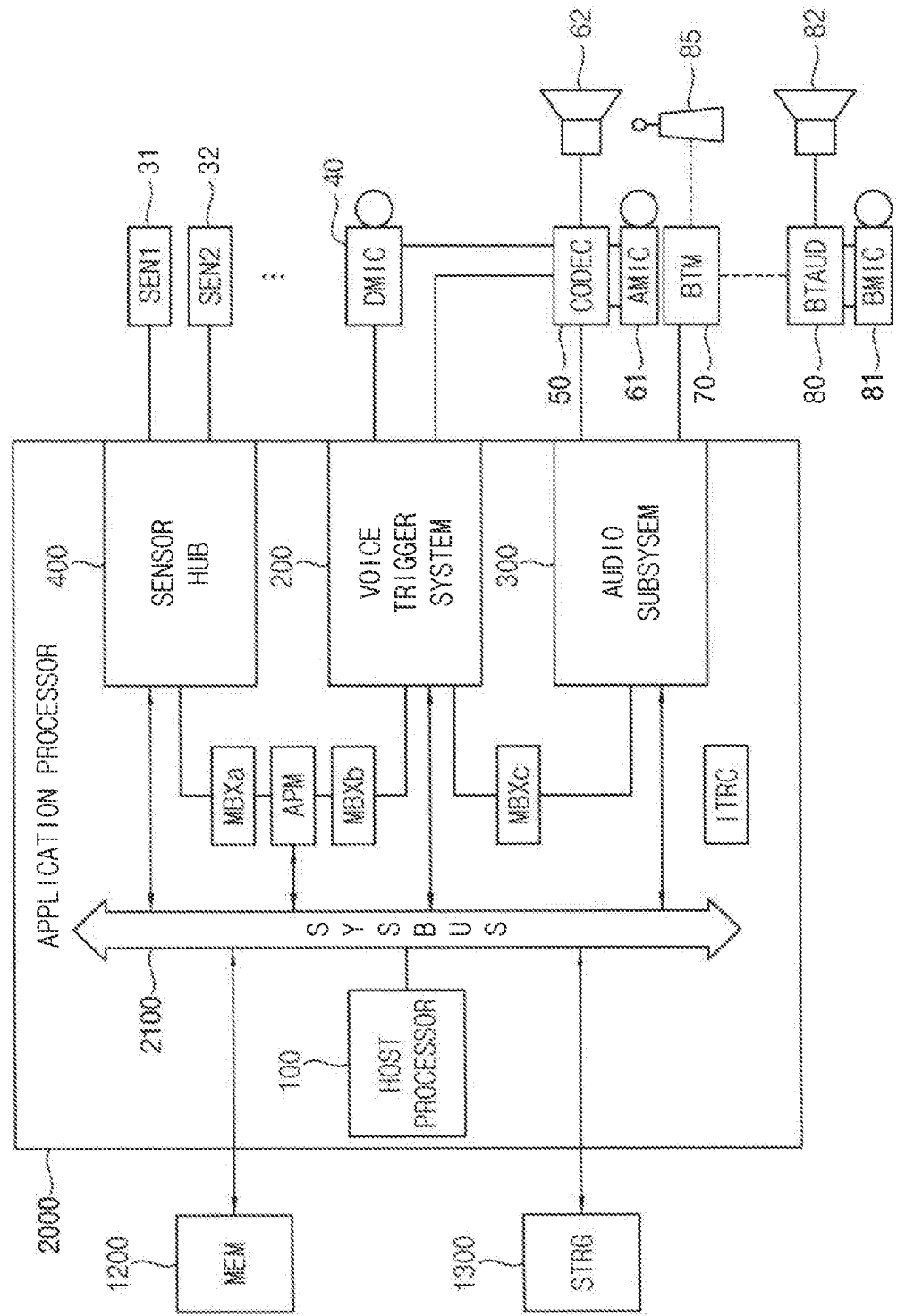
FIG. 3 is a block diagram illustrating an application processor according to example embodiments.

FIG. 3 is a block diagram illustrating an application processor according to example embodiments.

Referring to FIG. 3, an application processor 2000 may include a system bus SYSBUS 2100, a host processor CPU 100, a voice trigger system 200, an audio subsystem 300 and a sensor hub 400. The audio subsystem 300 and the sensor hub 400 may be included in the audio processing system 250 in FIG. 2A. According to example embodiments, the application processor 2000 may further include an active power manager APM, mail box modules MBXa, MBXb and MBXc, and an interrupt controller ITRC.

The system bus 2100 may be referred to as an interconnect device or a backbone. The system bus 2100 may include a higher-layer bus, a lower-layer bus and a bridge connecting them. For example, the system bus 2100 may include various buses such as an advanced extensible interface (AXI), an advanced high-performance bus (AHB), an advanced peripheral bus (APB), etc. and at least one bridge connecting the advanced extensible interface (AXI), the advanced high-performance bus (AHB), the advanced peripheral bus (APB), etc. The host processor 100 may access external devices such as a memory device 1200 and/or a storage device 1300 through the system bus 2100. In addition, the host processor 100 may communicate with the voice trigger system 200, the audio subsystem 300 and the sensor hub 400 through the system bus 2100.

Although one interrupt controller ITRC is illustrated in FIG. 3 for convenience of illustration, the interrupt controller ITRC may include at least one general interrupt controller (GIC), at least one vectored interrupt controller (VIC), etc. For example, the interrupt controller ITRC may be implemented as a programmable interrupt controller (PIC). The programmable interrupt controller may be implemented with multiple layers having a priority system represented by vectors. The programmable interrupt controller may receive an interrupt signal from peripheral devices, determine priorities of the received interrupt signal and issue an interrupt signal with a pointer address to a processor or a controller.

The active power manager APM may manage power of the application processor 2000. The active power manager APM may manage power supplied to respective regions or function blocks of the application processor 2000. The mail box modules MBXa, MBXb and MBXc may support a synchronization of data communication between the elements in the application processor 2000 or data communication between the application processor 2000 and external devices. The mail box modules MBXa, MBXb and MBXc will be described below with reference to FIG. 6.

The voice trigger system 200 is electrically connected to the system bus 2100. The voice trigger system 200 performs a voice trigger operation and issues a trigger event based on a trigger input signal that is provided through a trigger interface. In some example embodiments, the voice trigger system 200 may receive the trigger input signal from a digital microphone DMIC 40 and/or an audio codec (coder and decoder) CODEC 50. In other words, the trigger interface of the voice trigger system 200 may be connected directly to the digital microphone 40 and the audio codec 50. The audio codec 50 may perform encoding and decoding (or analog-to-digital conversion (ADC) and digital-to-analog conversion (DAC)) of an audio signal received from the digital microphone 40 and/or an analog microphone AMIC 61 and an audio signal output to a speaker 62. The digital microphone 40 may be an on-board microphone that is mounted with the application processor 2000 on a board of the electronic device. The analog microphone 61 and the speaker 62 may be devices attached and detachable from terminals of the audio codec 50.

The audio subsystem 300 is electrically connected to the system bus 2100 and the audio subsystem 300 processes audio streams that are replayed or recorded through an audio interface and supports transfer of the audio streams between the memory device 1200 and the audio interface. In some example embodiments, the audio subsystem 300 may exchange the audio streams with the audio codec 50 and/or a Bluetooth module BTM 70. In other words, the audio interface of the audio subsystem 300 may be connected directly to the audio codec 50 and the Bluetooth module 70. The Bluetooth module 70 may be connected to a Bluetooth microphone BMIC 81 and a Bluetooth speaker 82 through a Bluetooth transfer module BTAUD 80 to receive the audio signal from the Bluetooth microphone 81 and output the audio signal to the Bluetooth speaker 82. The Bluetooth module 70 may be connected directly to another Bluetooth speaker 85. Although not illustrated in FIG. 3, the audio subsystem 300 may be connected to a universal serial bus (USB) module to exchange the audio stream with the USB module.

The sensor hub 400 is electrically connected to the system bus and the sensor hub 400 processes signals provided from one or more sensors SEN1 31 and SEN2 32. The sensor hub 400 may measure physical quantities associated with the electronic device and process the physical quantities to detect an operation status of the electronic device and process the detected operation status. For example, the sensors 31 and 32 may include a motion sensor, a gyro sensor, an atmospheric pressure sensor, a magnetic sensor, an accelerometer, a grip sensor, a proximity sensor, a biometric sensor, a temperature/humidity sensor, an illumination sensor, and an ultra violet (UV) sensor, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor.

In some example embodiments, as illustrated in FIG. 3, all of the system bus 2100, the voice trigger system 200, the audio subsystem 300 and the sensor hub 400 may be integrated in a single semiconductor chip forming the application processor 2000. In other example embodiments, the system bus 2100, the voice trigger system 200 and the audio subsystem 300 may be integrated in a single chip and the sensor hub 400 may be disposed external to the application processor 2000. However, in either case, the voice trigger system 200 is provided on the application processor 2000 and thus, the application processor, the electronic device including the application processor and the method of operating the application processor according to example embodiments may perform the voice trigger operation with low power and high efficiency by integrating the voice trigger system in the application processor.

Figure 4:
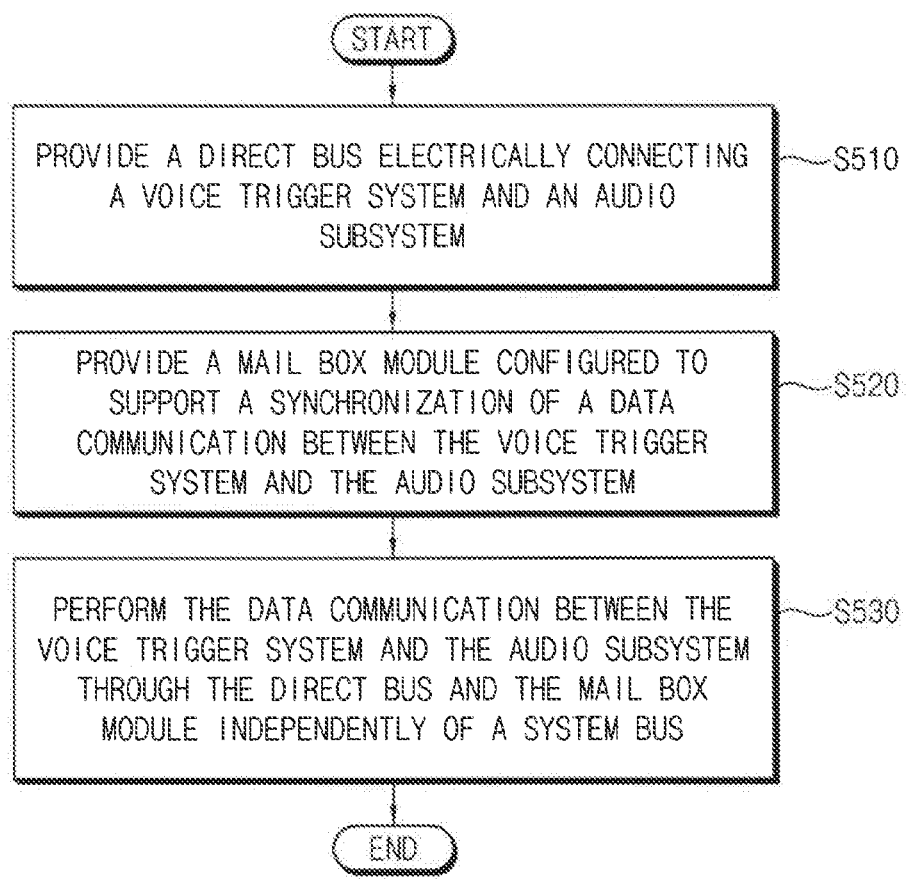
FIG. 4 is a flow chart illustrating a method of operating an application processor according to example embodiments.

FIG. 4 is a flow chart illustrating a method of operating an application processor according to example embodiments.

Referring to FIG. 4, a direct bus is provided to electrically connect a voice trigger system and an audio subsystem (S510) and a mail box module is provided to support a synchronization of a data communication between the voice trigger system and the audio subsystem (S520). The data communication is performed between the voice trigger system and the audio subsystem through the direct bus and the mail box module independently of a system bus (S530).

Hereinafter, example embodiments of the method of FIG. 4 and associated configuration of an application processor will be described below with reference to FIGS. 5, 6 and 7.

Figure 5:
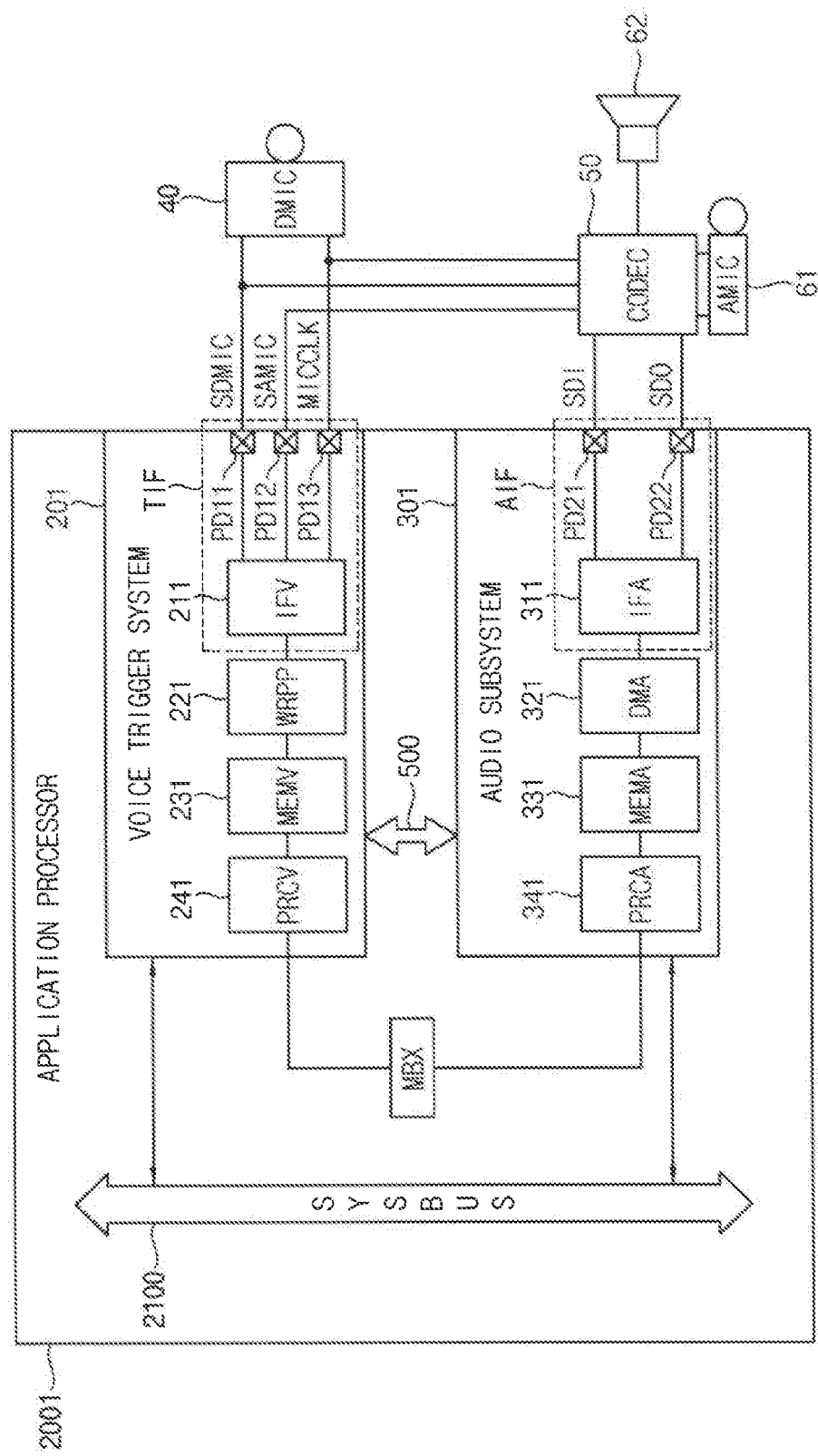
FIG. 5 is a block diagram illustrating an example connection of a voice trigger system and an audio subsystem in an application processor according to example embodiments.

FIG. 5 is a block diagram illustrating an example connection of a voice trigger system and an audio subsystem in an application processor according to example embodiments. The host processor 100 and other elements of FIG. 3 are present but are omitted in FIG. 5 for convenience of illustration.

Referring to FIG. 5, an application processor 2001 may include a system bus SYSBUS 2100, a voice trigger system 201, an audio subsystem 301, a direct bus 500 and a mail box module MBX. The audio subsystem 301 may be included in the audio processing system 250 in FIG. 2A.

The voice trigger system 201 is electrically connected to the system bus 2100 and the voice trigger system 201 performs a voice trigger operation based on a mic trigger input signal SDMIC and/or a codec trigger input signal SAMIC that are provided through a trigger interface TIF. The voice trigger system 201 may receive the mic trigger input signal SDMIC from a digital microphone DMIC 40 and/or the codec trigger input signal SAMIC from an audio codec (coder and decoder) CODEC 50. A microphone clock signal MICCLK may be transferred between the voice trigger system 201, the digital microphone 40 and the audio codec 50 for a synchronization of a signal transfer. The mic and codec trigger input signal SDMIC and SAMIC and the microphone clock signal MICCLK may be transferred through pads PD11, PD12 and PD13. The pads PD11, PD12 and PD13 may be implemented such that the used pad may be prevented from being interfered with the other unused pads.

The audio subsystem 301 is electrically connected to the system bus 2100 and the audio subsystem 301 processes audio streams that are replayed or recorded through an audio interface AIF and supports transfer of the audio streams between the memory device 1200 and the audio interface. In some example embodiments, the audio subsystem 301 may exchange the audio streams with the audio codec 50. The audio subsystem 301 may receive an audio input signal SDI through an audio input pad PD21 from the audio codec 50 and transmit an audio output signal SDO through an audio output pad PD22 to the audio codec 50.

The voice trigger system 201 may include a trigger interface circuit IFV 211, a wrapper WRPP 221, a trigger memory MEMV 231 and a trigger processor PRCV 241.

The trigger interface circuit 211 and the pads PD11, PD12 and PD13 may form the trigger interface TIF to sample and convert the mic trigger input signal SDMIC provided from the digital microphone 40 and/or the codec trigger input signal SAMIC provided from the audio codec 50. The wrapper 221 may store data provided from trigger interface circuit 211 in the trigger memory 231. The wrapper 221 may issue an interrupt signal to the trigger processor 241 when a threshold amount of data is stored in the trigger memory 231 so that the trigger processor 241 may perform the voice trigger operation based on data stored in the trigger memory 231.

In some example embodiments, the voice trigger system 201 may receive a pulse density modulation (PDM) signal as the mic and codec trigger input signals SDMIC and SAMIC and convert the PDM signal to a pulse code modulation (PCM) data. The wrapper 221 may store the PCM data in the trigger memory 231. The wrapper 221 may be implemented with a direct memory access controller.

The audio subsystem 301 may include an audio interface circuit IFA 311, a direct memory access controller DMA 321, an audio memory MEMA 331 and an audio processor PRCA 341.

The audio interface circuit 311 and the audio input and output pads PD21 and PD22 may form the audio interface AIF to transfer the audio streams through the audio input signal SDI and the audio output signal SDO. The audio memory 331 may store data of the audio streams, and the direct memory access controller 321 may control access to the audio memory, that is, data read from the audio memory 331 and data write to the audio memory 331. The audio processor 341 may process data stored in the audio memory 331.

In some example embodiments, the audio interface circuit IFA 311 may be compatible with I2S (Inter-IC Sound) or IIS (Integrated Interchip Sound) standard. Even though not illustrated in FIG. 5, the audio interface circuit 311 may operate based on clock signals according to the I2S standard. In some example embodiments, the audio interface circuit 311 may be connected directly to the digital microphone 40 and/or the audio codec 50.

As illustrated in FIG. 5, the application processor 2001 may further include the direct bus 500 connecting the voice trigger system 201 and the audio subsystem 301. In addition, the application processor 2001 may further include the mail box module MBX supporting a synchronization of a data transmission or a data communication between the voice trigger system 201 and the audio subsystem 301.

The application processor 2001 may perform the data communication between the voice trigger system 201 and the audio subsystem 301 through the direct bus 500 and the mail box module MBX independently of the system bus 2100. The direct bus 500 is not limited to a typical bus system and the direct bus 500 may be implemented with arbitrary signal transmission schemes.

In some example embodiments, the audio subsystem 301 may use at least a portion of the trigger memory MEMV 231 in the voice trigger system 201 as a cache memory through the direct bus 500 in a case in which the voice trigger system 201 does not perform the voice trigger operation. For example, the voice trigger system 201 may not perform the voice trigger operation while the application processor 2001 performs a call function or a recording function. In this case, the audio subsystem 301 may enhance the operation speed by utilizing at least portion of the trigger memory 231 as a cache memory. For example, the audio subsystem 301 may use the audio memory MEMA 331 internal to the audio subsystem 301 as an L1 cache and the trigger memory 231 in the voice trigger system 201 as an L2 cache.

Figure 6:
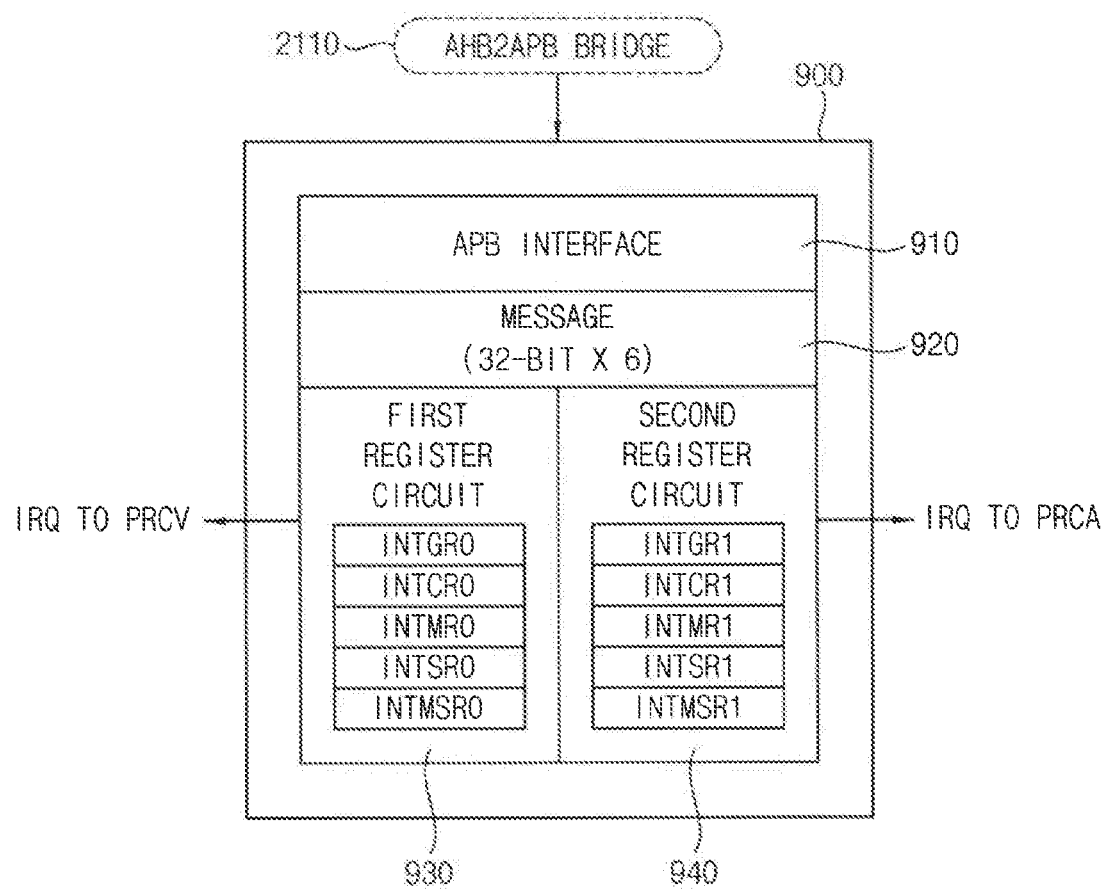
FIG. 6 is a diagram illustrating an example embodiment of a mail box module included in the application processor of FIG. 5.

FIG. 6 is a diagram illustrating an example embodiment of a mail box module included in the application processor of FIG. 5.

Referring to FIG. 6, a mail box module 900 may include an interface APB INTERFACE 910, a message box MESSAGE 920, a first register circuit 930 including a plurality of registers INTGR0, INTCR0, INTMR0, INTSR0 and INTMSR0, and a second register circuit 940 including a plurality of registers INTGR1, INTCR1, INTMR1, INTSR1 and INTMSR1. FIG. 6 illustrates a non-limiting example that the mail box module 900 is connected to an AHB2APB bridge of the system bus 2100 through an APB interface and the message box 920 is implemented with shared registers of 6*32 bits. However, this is only an example and the type of the interface 910, and the number and the bit number of the registers in the message box 920 may be determined variously. The first register circuit 930 may generate an interrupt signal (IRQ TO PRCV) provided to the trigger processor PRCV in the voice trigger system 201 and the second register circuit 940 may generate an interrupt signal (IRQ TO PRCA) provided to the audio processor PRCA in the audio subsystem 301. The data transmission between the voice trigger system 201 and the audio subsystem 301 may be synchronized using the mail box module 900.

The mail box module 900 may perform bilateral communication by transmitting an interrupt signal after one of the trigger processor PRCV and the audio processor PRCA writes a message in the message box 920. The synchronization of the data transmission between the voice trigger system 201 and the audio subsystem 301 may be implemented through a polling method, etc.

Figure 7:
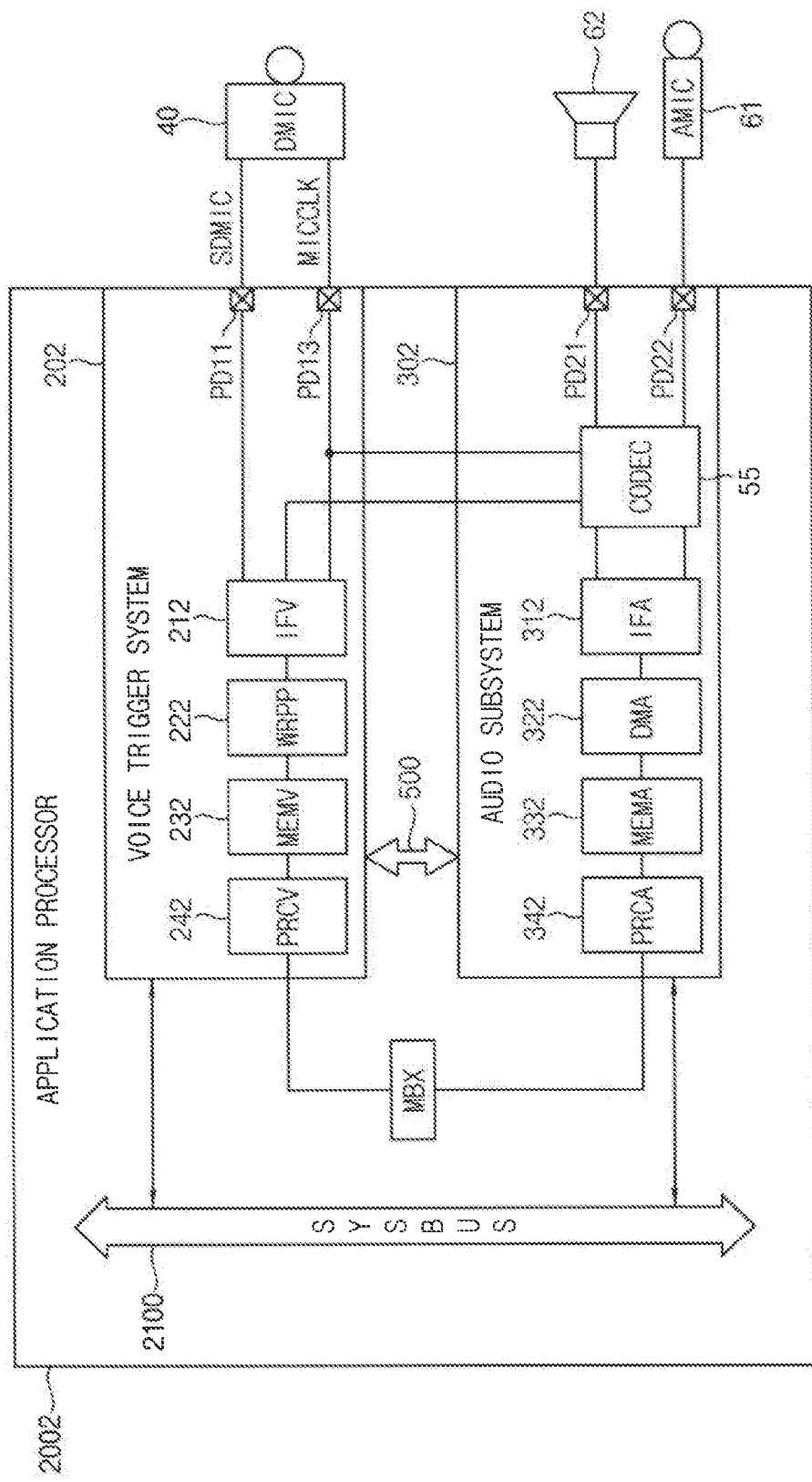
FIG. 7 is a block diagram illustrating an example connection of a voice trigger system and an audio subsystem in an application processor according to example embodiments.

FIG. 7 is a block diagram illustrating an example connection of a voice trigger system and an audio subsystem in an application processor according to example embodiments. The descriptions of components that are the same or similar as those in FIG. 5 are omitted for conciseness and clarity of description.

Referring to FIG. 7, an application processor 2002 may include a system bus SYSBUS 2100, a voice trigger system 202, an audio subsystem 302, a direct bus 500 and a mail box module MBX. The audio subsystem 302 may be included in the audio processing system 250 in FIG. 2A.

The voice trigger system 202 may include a trigger interface circuit IFV 212, a wrapper WRPP 222, a trigger memory MEMV 232 and a trigger processor PRCV 242. The audio subsystem 302 may include an audio interface circuit IFA 312, a direct memory access controller DMA 322, an audio memory MEMA 332 and an audio processor PRCA 342.

In comparison with the application processor 2001 of FIG. 5 in which the audio subsystem is connected to the external audio codec 50, the application processor 2002 may include an on-chip audio codec 55. Even though the audio codec 55 is shown as included in the audio subsystem 302 in FIG. 7, in some example embodiments the audio codec 55 may be included in the voice trigger system 202 or disposed between the voice trigger system 202 and the audio subsystem 302. As such, the audio codec 55 may be integrated with the system bus 2100, the voice trigger system 202 and the audio subsystem 302 in a single semiconductor chip forming the application processor 2002.

Figure 8:
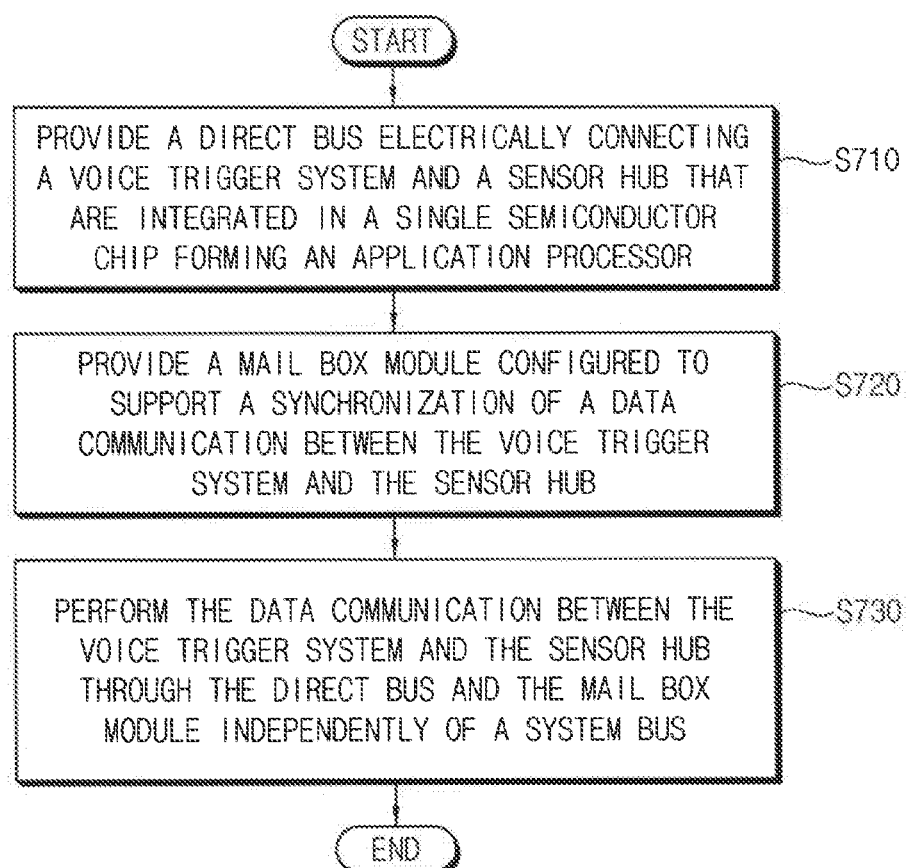
FIG. 8 is a flow chart illustrating a method of operating an application processor according to example embodiments.

FIG. 8 is a flow chart illustrating a method of operating an application processor according to example embodiments.

Referring to FIG. 8, a direct bus is provided to electrically connect a voice trigger system and a sensor hub (S710) and a mail box module is provided to support a synchronization of a data communication between the voice trigger system and the sensor hub (S720). The data communication between the voice trigger system and the sensor hub is performed through the direct bus and the mail box module independently of a system bus (S730).

Hereinafter, example embodiments of the method of FIG. 8 and associated configuration of an application processor will be described below with reference to FIGS. 9, 10A and 10B.

Figure 9:
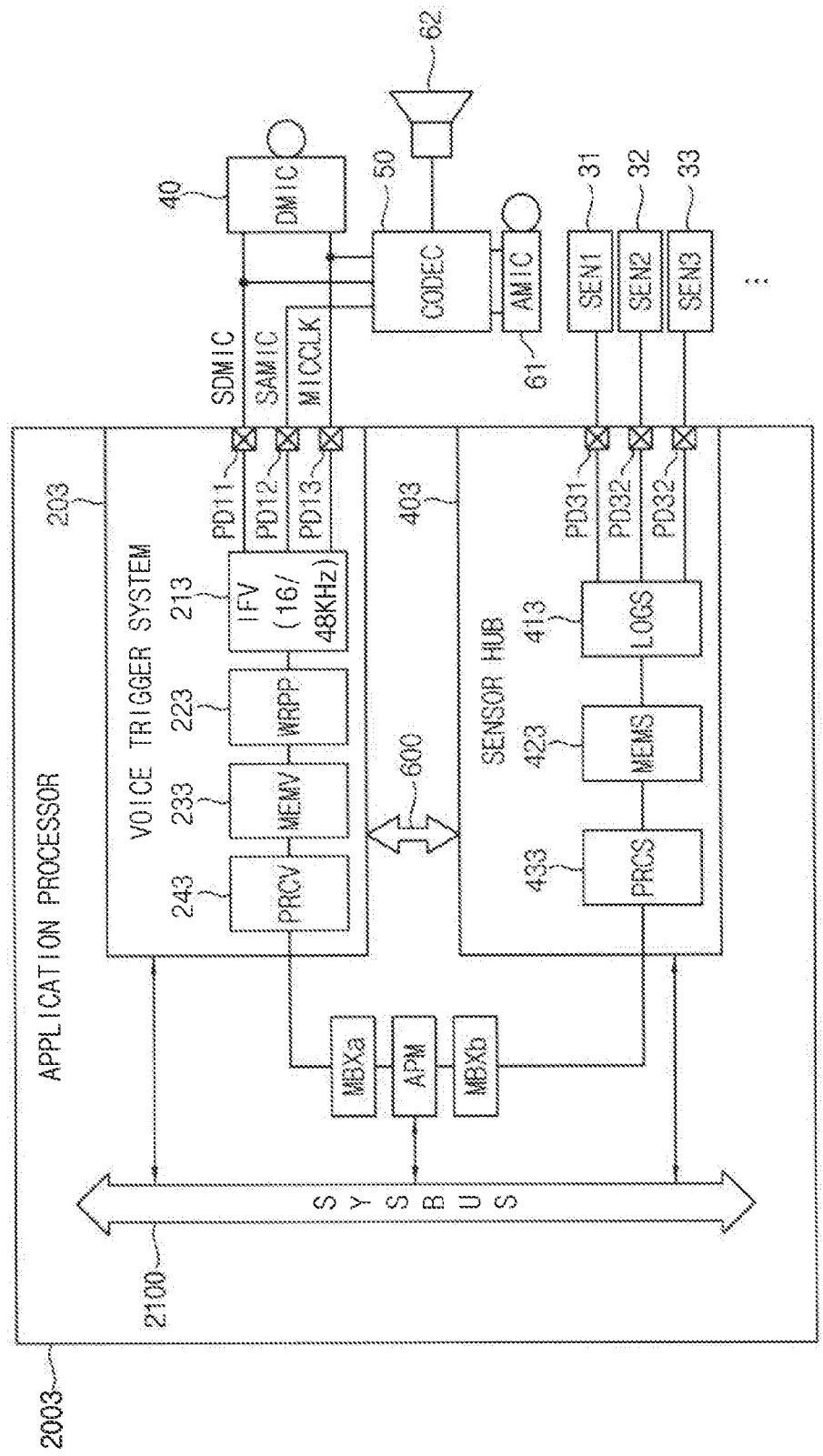
FIG. 9 is a block diagram illustrating an example connection of a voice trigger system and a sensor hub in an application processor according to example embodiments.

FIG. 9 is a block diagram illustrating an example connection of a voice trigger system and a sensor hub in an application processor according to example embodiments. The host processor 100 and other elements of FIG. 3 are present but are omitted in FIG. 9 for convenience of illustration.

Referring to FIG. 9, an application processor 2003 may include a system bus SYSBUS 2100, a voice trigger system 203, a sensor hub 403, a direct bus 600, an active power manager APM, and mail box modules MBXa and MBXb. The sensor hub 403 may be included in the audio processing system 250 in FIG. 2A.

The voice trigger system 203 is electrically connected to the system bus 2100 and the voice trigger system 203 performs a voice trigger operation based on mic and codec trigger input signals SDMIC and SAMIC that are provided through a trigger interface. The voice trigger system 203 may receive the mic trigger input signal SDMIC from a digital microphone DMIC 40 and/or the codec trigger input signal SAMIC from an audio codec CODEC 50. A microphone clock signal MICCLK may be transferred between the voice trigger system 203, the digital microphone 40 and the audio codec 50 for a synchronization of a signal transfer. The mic and codec trigger input signals SDMIC and SAMIC and the microphone clock signal MICCLK may be transferred through pads PD11, PD12 and PD13, respectively.

The sensor hub 403 is electrically connected to the system bus 2100 to process signals provided from one or more sensors SEN1 31, SEN2 32 and SEN3 33.

The voice trigger system 203 may include a trigger interface circuit IFV 213, a wrapper WRPP 223, a trigger memory MEMV 233 and a trigger processor PRCV 243.

The trigger interface circuit 213 and the pads PD11, PD12 and PD13 may form the trigger interface TIF to sample and convert the mic trigger input signal SDMIC provided from the digital microphone 40 or the codec trigger input signal SAMIC provided from the audio codec 50. The wrapper 223 may store data provided from trigger interface circuit 213 in the trigger memory 233. The wrapper 223 may issue an interrupt signal to the trigger processor 243 when a threshold amount of data is stored in the trigger memory 233 so that the trigger processor 243 may perform the voice trigger operation based on data stored in the trigger memory 233.

In some example embodiments, the voice trigger system 203 may receive a pulse density modulation (PDM) signal as the mic and codec trigger input signals SDMIC and SAMIC and convert the PDM signal to a pulse code modulation (PCM) data. The wrapper 223 may store the PCM data in the trigger memory 233. The wrapper 223 may be implemented with a direct memory access controller.

The sensor hub 403 may include a sensor logic LOGS 413, a sensor memory MEMS 423 and a sensor processor PRCS 433 to process the signals provided from the various sensors as described with reference to FIG. 3.

As illustrated in FIG. 9, the application processor 2003 may further include the direct bus 600 connecting the voice trigger system 203 and the sensor hub 403. In addition, the application processor 2003 may further include the active power manager APM and the first and second mail box modules MBXa and MBXb supporting a synchronization of a data transmission between the voice trigger system 203 and the sensor hub 403. The first mail box MBXa may transfer interrupt signals to the voice trigger system 203 and the active power manager APM. The second mail box MBXb may transfer interrupt signals to the active power manager APM and the sensor hub 403.

In some example embodiments, as illustrated in FIG. 9, the two mail box modules MBXa and MBXb may perform the synchronization of the data communication between the voice trigger system 203 and the sensor hub 403 via the active power manager APM. Each of the mail box modules MBXa and MBXb are the same as described with reference to FIG. 6. In other example embodiments, one mail box module may perform the synchronization between the voice trigger system 203 and the sensor hub 403 without the active power manager APM.

The application processor 2003 may perform the data communication between the voice trigger system 203 and the sensor hub 403 through the direct bus 600 and the mail box modules MBXa and MBXb independently of the system bus 2100.

Figure 10A:
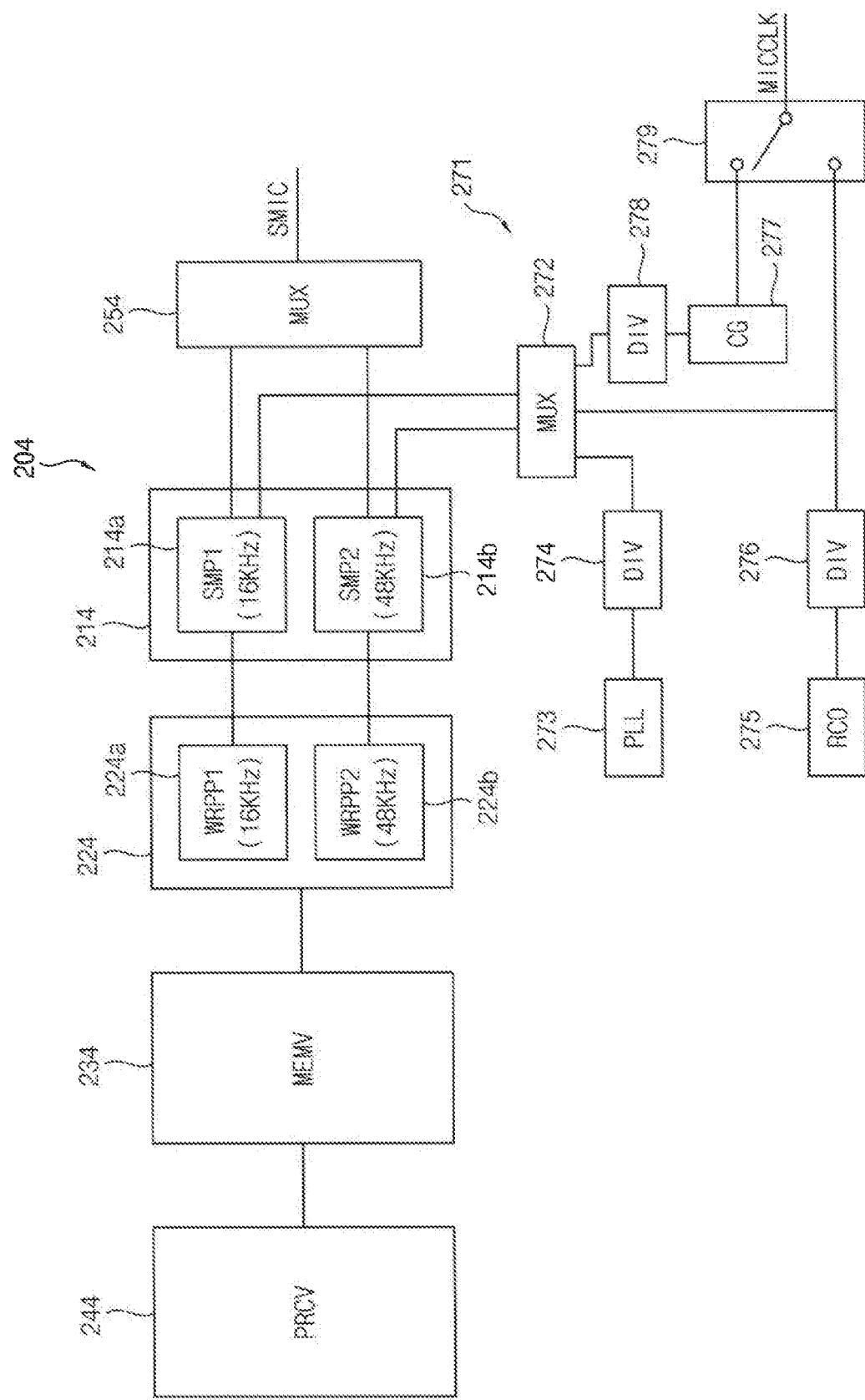
FIGS. 10A and 10B are block diagrams illustrating example embodiments of a voice trigger system included in the application processor of FIG. 9.
Figure 10B:
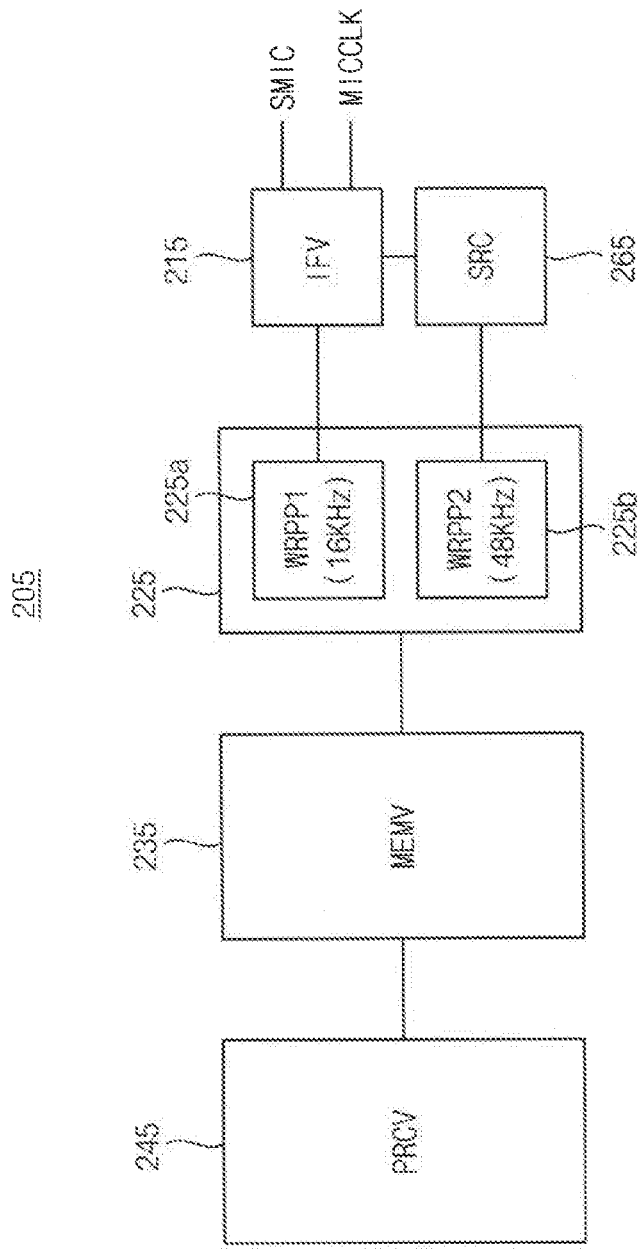

FIGS. 10A and 10B are block diagrams illustrating example embodiments of a voice trigger system included in the application processor of FIG. 9.

Referring to FIG. 10A, a voice trigger system 204 may include a trigger interface circuit 214, a wrapper 224, a trigger memory MEMV 234, a trigger processor PRCV 244 and a signal selector MUX 254. FIG. 10A further illustrates a clock supply circuit 271 including a clock selector MUX 272, a phase-locked loop circuit PLL 273, an RC oscillator RCO 275, clock dividers DIV 274, 276 and 278, a clock generator CG 277 and a switch 279. Some elements of the clock supply circuit 271 may be considered as a portion of the voice trigger system 204. For example, the RC oscillator 275 may be included in the voice trigger system 204 or disposed external to the voice trigger system 204. The clock supply circuit 271 may receive a clock signal from an external device such as an audio codec or from an internal block of the application processor.

The trigger interface circuit 214 may sample the trigger input signal SMIC provided from a digital microphone or an audio codec and convert the sampled data. The wrapper 224 may store data provided from trigger interface circuit 214 in the trigger memory 234. The wrapper 224 may issue an interrupt signal to the trigger processor 244 when a threshold amount of data is stored in the trigger memory 234 so that the trigger processor 244 may perform the voice trigger operation based on data stored in the trigger memory 234.

The trigger interface circuit 214 may include a first sampler SMP1 214a configured to generate first sample data by sampling the trigger input signal SMIC with a first sampling rate, and a second sampler SMP2 214b configured to generate second sample data by sampling the trigger input signal SMIC with a second sampling rate higher than the first sampling rate. The wrapper 224 may include a first wrapper WRPP1 224a configured to store the first sample data in the trigger memory 234, and a second wrapper WRPP2 224b configured to store the second sample data in the trigger memory 234. In some example embodiments, the first sampling rate may be 16 KHz and the second sampling rate may be 48 KHz. However, these rates are only illustrative and different rates are contemplated. The second sample data may correspond to an ultra sound wave included in the trigger input signal SMIC.

The voice trigger system 204 may generate the first sample data of the first sampling rate in a first operation mode, and generate both of the first sample data of the first sampling rate and the second sample data of the second sampling rate in a second operation mode. In the example configuration of FIG. 10A, the first sampler 214a may be enabled and the second sample 214b may be disabled in the first operation mode, and both of the first sampler 214a and the second sample 214b may be enabled in the second operation mode. In some example embodiments, the first sampler may be disabled and the second sampler may be enabled in a third operation mode.

The signal selector 254 may provide the trigger input signal SMIC to only the first sampler 214a in the first operation mode, and to both of the first sampler 214a and the second sampler 214b in the second operation mode. The clock selector 272 may select one of a first clock signal from the phase-locked loop circuit 273 and the clock divider 274, a second clock signal from the RC oscillator 275 and the clock divider 276 and a third clock signal from the clock generator 277 and the clock divider 278 to provide the selected clock signal to the trigger interface circuit 214. The switch 279 may select one of the second clock signal and the third clock signal to provide the selected clock signal as a microphone clock signal MICCLK.

Referring to FIG. 10B, a voice trigger system 205 may include a trigger interface circuit IFV 215, a wrapper 225, a trigger memory MEMV 235, a trigger processor PRCV 245 and a sampling rate converter 265.

The trigger interface circuit 215 may sample the trigger input signal SMIC provided from a digital microphone or an audio codec and convert the sampled data. The wrapper 225 may store data provided from trigger interface circuit 215 in the trigger memory 235. The wrapper 225 may issue an interrupt signal to the trigger processor 245 when a threshold amount of data is stored in the trigger memory 235 so that the trigger processor 245 may perform the voice trigger operation based on data stored in the trigger memory 235.

The trigger interface circuit 215 may generate first sample data by sampling the trigger input signal SMIC with a first sampling rate, and the sampling rate converter 265 may generate second sample data by converting the first sample data to the second sample data of a second sampling rate higher than the first sampling rate, as illustrated in FIG. 10B. In contrast, in other example embodiments, the trigger interface circuit 215 may generate the second sample data by sampling the trigger input signal SMIC with the second sampling rate, and the sampling rate converter 265 may generate the first sample data by converting the second sample data to the first sample data.

The wrapper 225 may include a first wrapper WRPP1 225a configured to store the first sample data in the trigger memory 234, and a second wrapper WRPP2 225b configured to store the second sample data in the trigger memory 234. In some example embodiments, the first sampling rate may be 16 KHz and the second sampling rate may be 48 KHz. However, these rates are only illustrative and different rates are contemplated. The second sample data may correspond to an ultra sound wave included in the trigger input signal SMIC.

The voice trigger system 205 may generate the first sample data of the first sampling rate in a first operation mode, and both of the first sample data of the first sampling rate and the second sample data of the second sampling rate in a second operation mode. In addition, in some example embodiments the voice trigger system 205 may generate the second sample data of the second sampling rate in a third operation mode.

Figure 11:
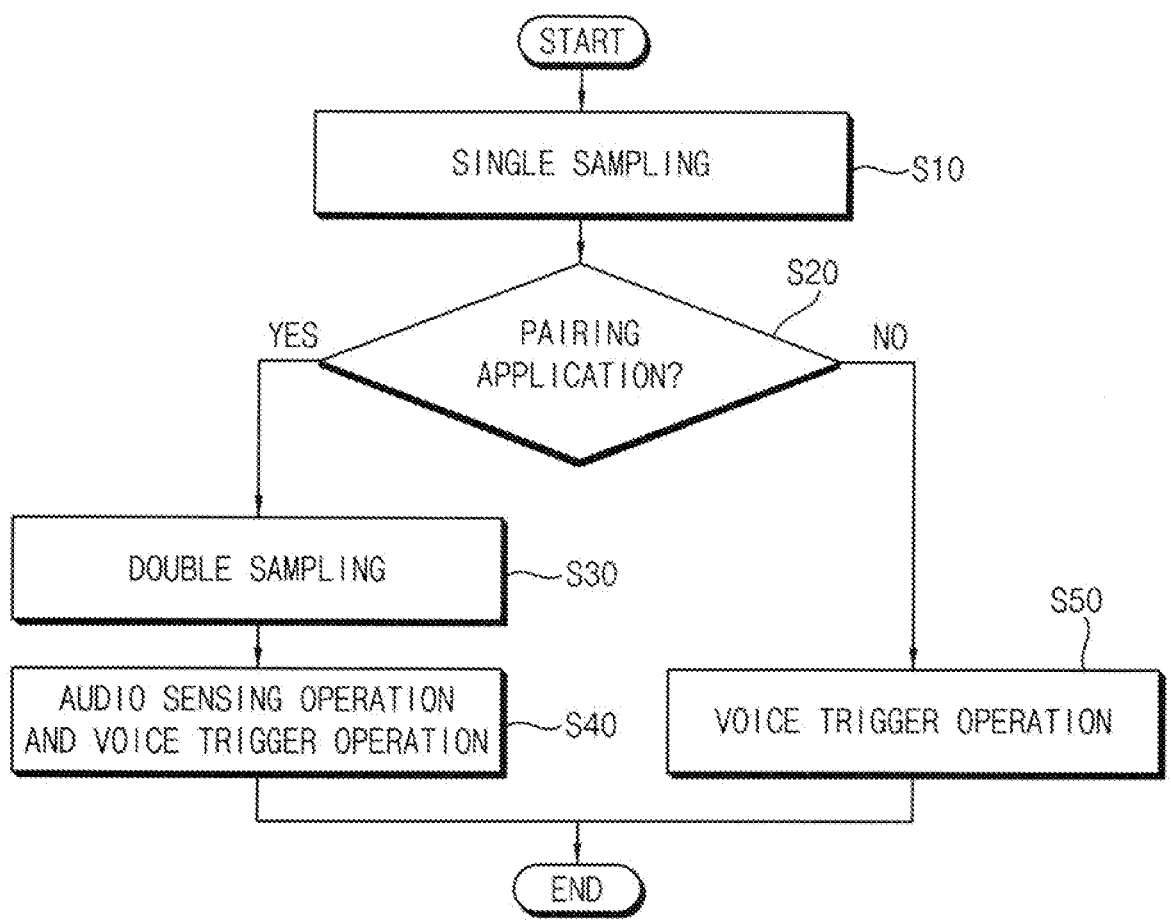
FIG. 11 is a flow chart illustrating a method of operating an application processor according to example embodiments.

FIG. 11 is a flow chart illustrating a method of operating an application processor according to example embodiments.

Referring to FIGS. 10A and 11, the voice trigger system 204 may perform a single sampling in the first operation mode (S10). In other words, the voice trigger system 204 may generate the first sample data by sampling the trigger input signal SMIC with the first sample rate (e.g., 16 KHz) in the first operation mode.

The electronic device may determine whether a pairing application is executed in operation S20. When a pairing application is executed (S20: YES), the voice trigger system 204 is converted to the second operation mode to perform a double sampling (S30). In other words, the voice trigger system 204 may generate the first sample data and the second sample data by sampling the trigger input signal SMIC with the first sampling rate (e.g., 16 KHz) and the second sampling rate (e.g., 48 KHz).

In the second operation mode, the audio subsystem or the sensor hub may perform an audio sensing operation based on the second sample data and the voice trigger system performs the voice trigger operation based on the first sample data (S40).

In contrast, when the pairing application is not executed (S20: NO), the voice trigger system 204 may maintain the first operation mode and perform the voice trigger operation based on the first sample data (S50).

As such, the first operation mode may be a mode for performing only the voice trigger operation, and the second operation mode may be a mode for performing both of the voice trigger operation and the pairing operation. In some example embodiments, in a third operation mode, only the audio sensing operation such as the pairing operation may be performed.

As an example of the audio sensing operation or the pairing operation, mobile devices of users in a meeting room may be paired with a system in the meeting room through an ultra sound wave. The voice trigger system in the mobile device need not always monitor the signal from the external system. Rather the voice trigger system may enable the monitoring only if the user executes the pairing operation. In some example embodiments of the always monitoring by the voice trigger system, if the user is, for example, in a shopping mall, information on the shopping mall may be provided to the mobile device using an ultra sound wave that is in audible to the user's ears. The shopping mall may use a simple speaker output to trigger a transfer of information to the mobile device of the user.

Figure 12A:
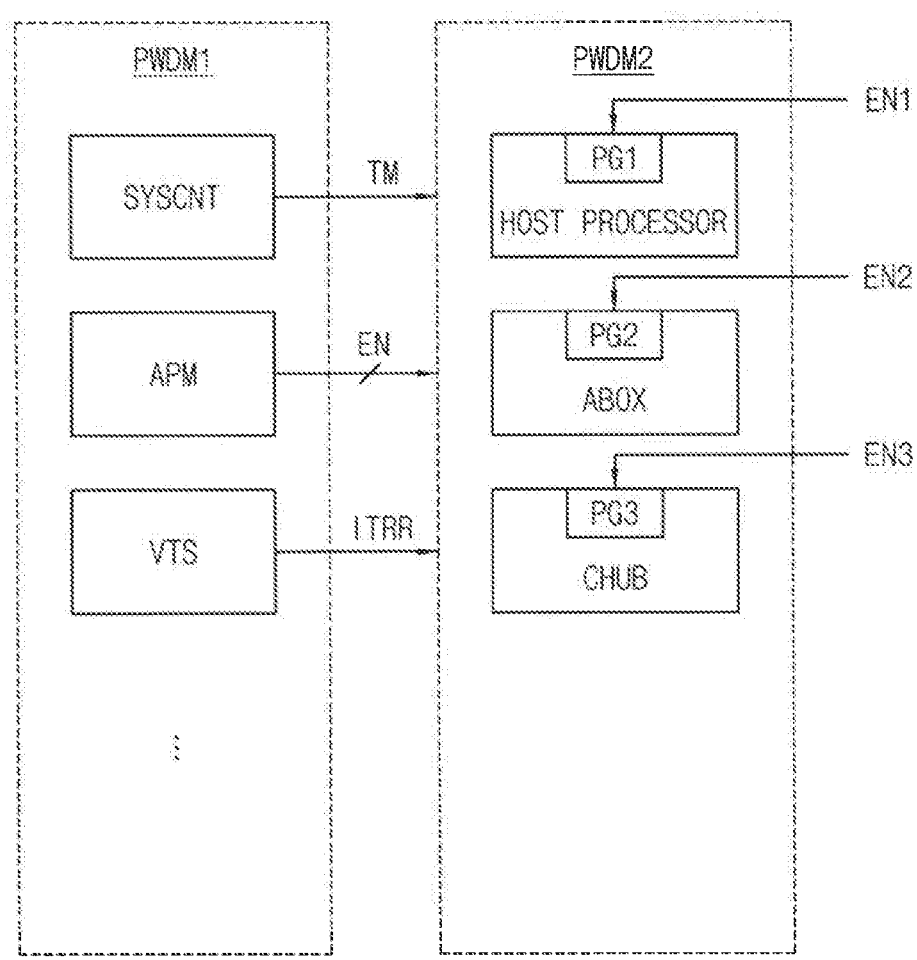
FIGS. 12A and 12B are diagrams for describing power domains of an application processor according to example embodiments.
Figure 12B:
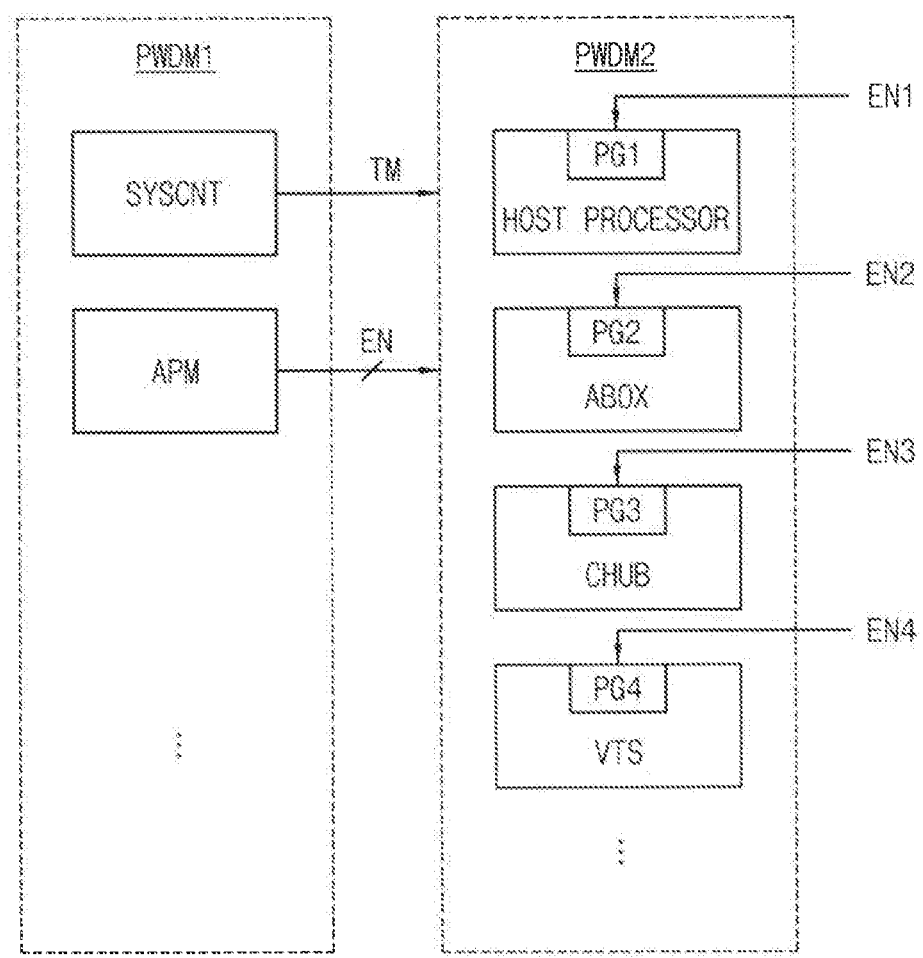

FIGS. 12A and 12B are diagrams for describing power domains of an application processor according to example embodiments.

An application processor may include a plurality of power domains that are independently powered. FIGS. 12A and 12B illustrate a first power domain PWDM1 and a second power domain PWDM2 as an example. The first power domain PWDM1 corresponds to an always-powered domain where power is supplied in both of an active mode and a standby mode (or a sleep mode) and the second power domain PWDM2 corresponds to a power-save domain where power is blocked in the standby mode.

Referring to FIG. 12A, a system counter SYSCNT, an active power manager APM and a voice trigger system VTS may be disposed in the always-powered domain PWDM1. A plurality of hardware blocks such as a host processor CPU, an audio subsystem ABOX, a sensor hub CHUB, etc. may be disposed in the power-save domain PWDM2.

The system counter SYSCNT may generate time information TM and provide the time information TM to internal circuits of the system. The active power manager APM may generate a plurality of power enable signals EN to control power supply, power block, etc. of various elements in the system. The voice trigger system VTS may generate an interrupt signal ITRR representing the trigger event.

In this disclosure, the active mode represents that at least the host processor CPU is enabled and an operating system (OS) runs. The sleep mode or the standby mode represents a power-down mode that the host processor CPU is disabled.

In comparison with the disposition of FIG. 12A, the voice trigger system VTS may be disposed in the power-save domain PWDM2 as illustrated in FIG. 12B.

As illustrated in FIGS. 12A and 12B, the host processor CPU, the voice trigger system VTS, the audio subsystem ABOX and the sensor hub CHUB may include power gating circuits PG1, PG2, PG3 and PG4, respectively. The power gating circuits PG1~PG4 may supply power selectively in response to power enable signals EN1, EN2, EN3 and EN4. As such, the voice trigger system VTS, the audio subsystem ABOX and the sensor hub CHUB may be power-gated and enabled independently of the host processor CPU. In some example embodiments, the voice trigger system VTS may request the active power manager APM to enable or disable the sensor hub CHUB so that the sensor hub CHUB may be enabled.

As described above, the application processor, the electronic device including the application processor and the method of operating the application processor according to example embodiments may perform the voice trigger operation with low power and high efficiency by integrating the voice trigger system in the application processor. The on-chip voice trigger system may perform some operations instead of a host processor in the application processor to reduce the power consumption and enhance the performance of the electronic device. In addition, data communication independent of a system bus may be performed using the on-chip voice trigger system and a direct bus to reduce wakeup frequency of the application processor to further reduce the power consumption and enhance the performance.

The present inventive concept may be applied to any electronic devices and systems supporting the voice trigger function. For example, the present inventive concept may be applied to systems such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An application processor comprising:
    a system bus;
    a host processor electrically connected to the system bus;
    a voice trigger system electrically connected to the system bus, the voice trigger system being configured to perform a voice trigger operation and issue a trigger event based on a trigger input signal that is provided through a trigger interface; and
    an audio subsystem comprising an audio interface and electrically connected to the system bus, the audio subsystem being configured to process audio streams through the audio interface;
    wherein the voice trigger system is disposed in an always-powered domain where power is supplied in both of an active mode and a standby mode;
    wherein the host processor and the audio subsystem are disposed in a power-save domain where power is blocked in the standby mode;
    wherein, the host processor launches into the active mode when the voice trigger system issues the trigger event.

2. The application processor of claim 1, wherein all of the system bus, the host processor, the voice trigger system and the audio subsystem are integrated in a single semiconductor chip.

3. The application processor of claim 1, further comprising:
    a direct bus electrically connecting the voice trigger system and the audio subsystem.

4. The application processor of claim 3, further comprising:
    a mail box module configured to support a synchronization of data communication between the voice trigger system and the audio subsystem.

5. The application processor of claim 4, wherein the mail box module includes:
    a first register circuit configured to generate a first interrupt signal provided to the voice trigger system; and
    a second register circuit configured to generate a second interrupt signal provided to the audio subsystem.

6. The application processor of claim 4, wherein the data communication between the voice trigger system and the audio subsystem is performed through the direct bus and the mail box module independently of the system bus.

7. The application processor of claim 3, wherein the audio subsystem uses a memory in the voice trigger system as a cache memory through the direct bus during a time during which the voice trigger system does not perform the voice trigger operation.

8. The application processor of claim 1, further comprising:
    a sensor hub electrically connected to the system bus, the sensor hub being configured to process signals provided from at least one sensor.

9. The application processor of claim 8, wherein all of the system bus, the host processor, the voice trigger system, the audio subsystem and the sensor hub are integrated in a single semiconductor chip.

10. The application processor of claim 1, wherein the voice trigger system receives the trigger input signal from a digital microphone or an audio codec to process outputs of an analog microphone.

11. The application processor of claim 10, wherein the audio codec is integrated together with the system bus, the host processor, the voice trigger system and the audio subsystem in a single semiconductor chip.

12. The application processor of claim 1, wherein the voice trigger system includes:
    a trigger memory;
    a trigger interface circuit forming the trigger interface to sample and convert the trigger input signal provided from a digital microphone or an audio codec;
    a wrapper configured to store data provided from the trigger interface circuit in the trigger memory; and
    a trigger processor configured to perform the voice trigger operation based on the data stored in the trigger memory.

13. The application processor of claim 12, wherein the trigger interface circuit includes:
    a first sampler configured to generate first sample data by sampling the trigger input signal with a first sampling rate; and a second sampler configured to generate second sample data by sampling the trigger input signal with a second sampling rate higher than the first sampling rate.

14. The application processor of claim 13, wherein the first sampler is enabled and the second sampler is disabled in a first operation mode, both of the first sampler and the second sampler are enabled in a second operation mode, and the first sampler is disabled and the second sampler is enabled in a third operation mode.

15. The application processor of claim 14, wherein the second operation mode is to perform both of the voice trigger operation and a pairing operation with an external device, the first operation mode is to perform only the voice trigger operation, and the third operation mode is to perform only the pairing operation.

16. The application processor of claim 15, wherein the voice trigger operation and the pairing operation are performed during a sleep mode in which the host processor is disabled.

17. The application processor of claim 12, wherein the trigger interface circuit generates first sample data by sampling the trigger input signal with a first sampling rate or second sample data by sampling the trigger input signal with a second sampling rate higher than the first sampling rate, and
wherein the voice trigger system further includes:
a sample rate converter configured to convert the first sample data to the second sample data or convert the second sample data to the first sample data.

18. The application processor of claim 1, wherein the audio subsystem includes:
an audio interface circuit forming the audio interface to transfer the audio streams;
an audio memory configured to store data of the audio streams;
a direct memory access controller configured to control access to the audio memory; and
an audio processor configured to process the data stored in the audio memory.

19. An electronic device comprising:
at least one audio input-output device; and
an application processor comprising:
a system bus;
a host processor electrically connected to the system bus;
a voice trigger system electrically connected to the system bus, the voice trigger system being configured to perform a voice trigger operation and issue a trigger event based on a trigger input signal that is provided through a trigger interface; and
an audio subsystem comprising an audio interface and electrically connected to the system bus, the audio subsystem being configured to process audio streams through the audio interface;
wherein the voice trigger system is disposed in an always-powered domain where power is supplied in both of an active mode and a standby mode;
wherein the host processor and the audio subsystem are disposed in a power-save domain where power is blocked in the standby mode;
wherein, the host processor launches into the active mode when the voice trigger system issues the trigger event.

20. A method comprising:
performing, by a voice trigger system, a voice trigger operation based on a trigger input signal provided through a trigger interface to issue a trigger event, the voice trigger system being integrated in a single semiconductor chip forming an application processor, with a host processor, an audio subsystem and a system bus electrically connecting the host processor, the voice trigger system and the audio subsystem;
launching into an active mode when the voice trigger system issues the trigger event; and
processing, by the audio subsystem, audio streams through an audio interface of the audio subsystem;
wherein the voice trigger system is disposed in an always-powered domain where power is supplied in both of the active mode and a standby mode;
wherein the host processor and the audio subsystem are disposed in a power-save domain where power is blocked in the standby mode.

* * * * *